(12) United States Patent
Sauer

(10) Patent No.: US 8,109,533 B2
(45) Date of Patent: Feb. 7, 2012

(54) AIRBAG MODULE FOR A MOTOR VEHICLE

(75) Inventor: Frank Sauer, Niedernberg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 13/006,254

(22) Filed: Jan. 13, 2011

(65) Prior Publication Data

US 2011/0109065 A1     May 12, 2011

Related U.S. Application Data

(63) Continuation of application No. PCT/EP2009/062681, filed on Sep. 30, 2009.

(30) Foreign Application Priority Data

Oct. 7, 2008  (DE) .......................... 10 2008 050 759

(51) Int. Cl.
*B60R 21/26* (2011.01)

(52) U.S. Cl. ..................... 280/736; 280/741; 280/728.2; 102/704

(58) Field of Classification Search .............. 280/728.2, 280/736, 741, 743.2; 102/704
See application file for complete search history.

(56) References Cited

U.S. PATENT DOCUMENTS

| | | | | |
|---|---|---|---|---|
| 7,673,900 | B2 * | 3/2010 | Yokoyama et al. | 280/742 |
| 7,690,680 | B2 * | 4/2010 | Meissner et al. | 280/736 |
| 7,845,678 | B2 * | 12/2010 | Pausch | 280/735 |
| 7,896,393 | B2 * | 3/2011 | Meissner et al. | 280/736 |
| 2002/0135160 | A1 | 9/2002 | Lorenz | |
| 2003/0020266 | A1 | 1/2003 | Vendely et al. | |
| 2003/0107207 | A1 * | 6/2003 | Elqadah et al. | 280/735 |
| 2004/0017069 | A1 | 1/2004 | Fischer | |
| 2004/0155442 | A1 | 8/2004 | Ford et al. | |
| 2007/0145724 | A1 | 6/2007 | Miwa et al. | |
| 2007/0228710 | A1 | 10/2007 | Ishiguro et al. | |
| 2008/0150267 | A1 | 6/2008 | Lube et al. | |
| 2008/0258438 | A1 | 10/2008 | Meissner et al. | |
| 2010/0201110 | A1 | 8/2010 | Meissner et al. | |

FOREIGN PATENT DOCUMENTS

| | | |
|---|---|---|
| DE | 101 14 208 A1 | 5/2002 |
| DE | 103 32 549 A1 | 3/2004 |
| DE | 20 2005 016 457 U1 | 1/2006 |
| DE | 10 2005 060 684 A1 | 12/2006 |
| DE | 10 2005 039 419 A1 | 3/2007 |
| DE | 10 2006 010 953 A1 | 9/2007 |
| EP | 1 803 613 A1 | 7/2007 |

OTHER PUBLICATIONS

International Search Report in PCT/EP2009/062681 dated Dec. 29, 2009.
Notification of the International Preliminary Report on Patentability (IPRP) in PCT/EP2009/062681 dated Apr. 21, 2011.

\* cited by examiner

*Primary Examiner* — Drew Brown
(74) *Attorney, Agent, or Firm* — Foley & Lardner LLP

(57) ABSTRACT

The invention relates to an airbag module for a motor vehicle, comprising a gas sack package comprising a gas sack, an additional moveable element configured and provided to influence a state variable of the airbag, and a gas-tight protective covering that defines an inner space of the gas sack package, wherein the gas sack and the moveable element are arranged in said inner space, and a separate movement generating device configured and provided to move the moveable element. According to the invention, the movement generating device is arranged outside the inner space of the airbag package.

15 Claims, 9 Drawing Sheets

AIRBAG MODULE FOR A MOTOR VEHICLE

CROSS-REFERENCE TO RELATED PATENT APPLICATIONS

This is a continuation of International Application PCT/EP2009/062681, which has an international filing date of Sep. 30, 2009, this International Application was not published in English, but was published in German as WO 2010/040669 A1.

BACKGROUND

The invention relates to an airbag module for a motor vehicle.

Such an airbag module comprises a gas sack package comprising a gas sack that can be inflated with gas for protecting a person, an additional movable element that is configured and provided to influence a state variable of the gas sack, wherein said state variable can be a pressure of the gas residing in the gas sack, and a protective covering, which surrounds an inner space of the gas sack package in a gas-tight manner, wherein the gas sack and the movable element are arranged in said inner space. Such a protective covering can be formed out of a flexible, also elastic material. Particularly, it is a protective covering in the form of a protective film. Furthermore, such an airbag module comprises a movement generating device (actuator) associated to the movable element, which is designed to drive the movable element.

SUMMARY

It is desirable to provide for an airbag module of the kind mentioned in the beginning that is improved regarding the used installation space.

One disclosed embodiment relates to an airbag module for a motor vehicle, comprising a gas sack package comprising a gas sack, an additional movable element configured and provided to influence a state variable of the gas sack, and a gas-tight protective covering that defines an inner space of the gas sack package, wherein the gas sack and the moveable element are arranged in said inner space; and a movement generating device configured and provided to move the moveable element, in order to influence the state variable, wherein the movement generating device is arranged separately outside the inner space of the gas sack package, so that it is at least separated by the protective covering from the components of the airbag module arranged in the inner space of the gas sack package.

It is to be understood that the foregoing general description and the following detailed descriptions are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
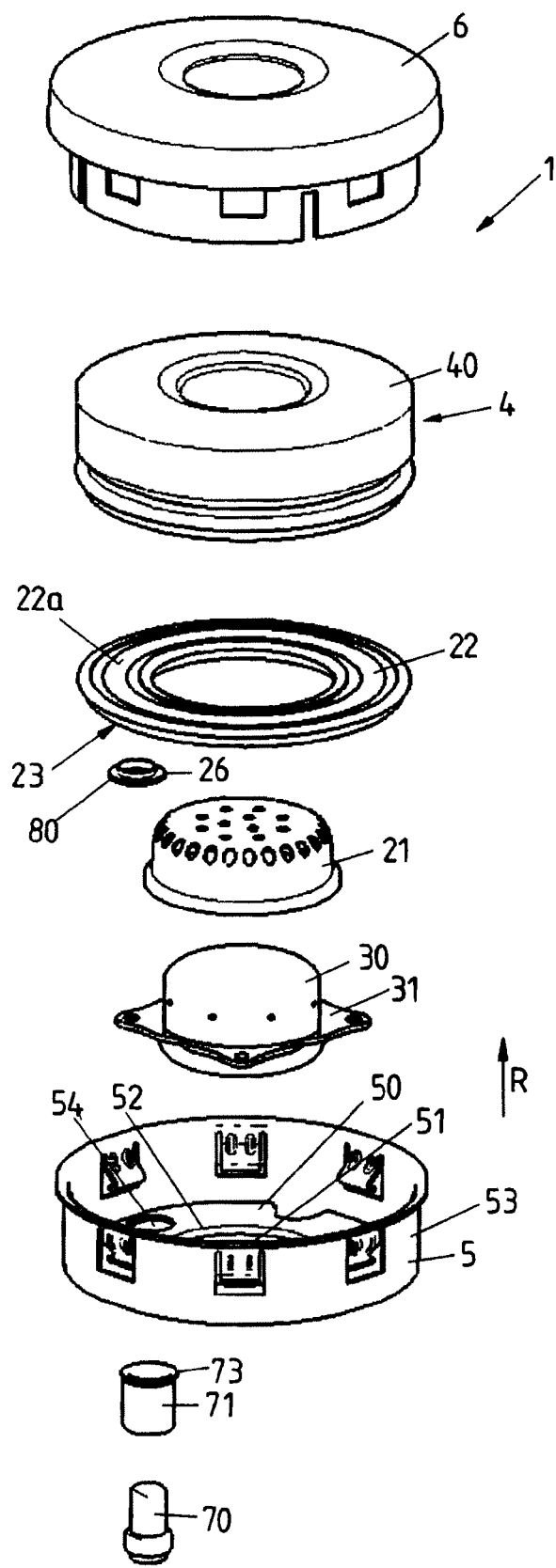
FIG. 1: shows an exploded view of an embodiment of the airbag module according to the invention.

According to one aspect of the invention, the movement generating device is arranged separately outside the inner space of the gas sack passage, i.e., is at least separated by the protective covering from the components of the airbag module arranged in the inner space of the gas sack package. This allows for a small-sized embodiment of the gas sack package, since due to the movement generating device being arranged outside the gas sack package, the gas sack package can be compacted in a simple manner (by evacuating the inner space of the gas sack package surrounded by the protective covering), particularly, the folding of the gas sack can be more simple, since the folding picture must not account for the movement generating device.

The gas needed for inflating the gas sack is particularly provided by a separate gas generator being different from the movement generating device, which gas generator is particularly arranged outside the inner space of the gas sack package.

Particularly, the movement generating device is designed to move the movable element out of an initial position, in which the movable element does not influence said state variable, in a way that the movable element influences the state variable, wherein said state variable is particularly a pressure of the gas residing in the gas sack. Hereby, the gas sack can be adapted to the weight (size) and the position of a person to be protected relative to the gas sack. Thereby, it is particularly provided that said pressure is constant (during the inflation procedure) or can be decreased by means of the movable element (e.g. in the so-called out-of-position case, in case of which the person to be protected is positioned too close to the gas sack).

In order to be able to move the movable element out of its initial position, the movement generating device is particularly designed to act on the movable element with a pressure. This pressure is particularly provided in a pyrotechnical manner by the movement generating device (gas generator).

In order to keep the dimensions of the gas sack package as small as possible, the inner space surrounded by the protective covering is particularly evacuated, i.e., the pressure in the inner space of the gas sack package is significantly smaller than the atmospheric pressure under standard conditions, so that the protective covering contracts due to the underpressure (particularly vacuum) in the inner space and tightly adapts to the components of the airbag module residing therein.

Furthermore, the airbag module comprises a carrier arranged outside the inner space of the gas sack package for carrying components of the airbag module, via which carrier the airbag module can also be fastened to a motor vehicle. Particularly, the movement generating device is fastened to the carrier.

Furthermore, the movement generating device is particularly inserted along a first direction into a through-opening formed in the carrier, so that a free end portion of the movement generating device, via which the pressure for acting on the movable element is provided, protrudes along the first direction into the carrier of the airbag module. Thereby, particularly a region of the protective covering faces a front face of the movement generating device extending across the first direction, wherein said region of the protective covering is destroyed by the pressure provided by the movement generating device and/or the heat of the gas mediating the pressure. The latter namely acts at first on said region of the protective covering and thereafter on the movable element lying behind it. Particularly, the free end portion of the movement generating device faces the movable element along the first direction.

In an embodiment of the invention, the free end portion of the movement generating device is inserted along the first direction into a further through-opening of a component of the airbag module arranged in the inner space of the gas sack package or is arranged in front of said further through-opening along the first direction, wherein said further through-opening particularly aligns with the through-opening formed on the carrier, i.e., the two openings face each other along the first direction. Particularly, said component can be a clamping element, a flange (of a diffusor) or a reservoir for storing a coolant. Said component can also integrate the afore-mentioned functions in an arbitrary manner, i.e., can be formed as a clamping element for a gas sack, wherein said clamping element forms a reservoir. Furthermore, said clamping element can also be a circulating flange of a diffusor.

Said further through-opening comprises a boundary circulating the further through-opening, from which a wall circulating the through-opening protrudes in the first direction, which wall can surround the free end portion across the first direction. Particularly, the free end portion of the movement generating device butts against said wall, namely at least with interposition of the protective covering of the gas sack package.

Optionally, a sealing element encompassing the free end portion of the movement generating device across the first direction is provided, which on the one hand serves for protecting the protective covering and on the other hand for sealing the further through-opening, wherein said end portion can butt against the wall with interposition of the sealing element and the protective covering. Thereby, the sealing element encompasses the free end portion and the protective covering encompasses in the region of the free end portion said sealing element and the free end portion of the movement generating device.

For carrying the movement generating device a shell surrounding the movement generating device is provided, which shell is fastened to a circulating boundary region of the through-opening of the carrier for fixing the movement generating device to the carrier of the airbag module.

Particularly, the further component provided in the inner space of the gas sack package is designed as a clamping element for clamping the gas sack to the carrier of the airbag module, wherein the clamping element is particularly formed by a circulating flange of a diffusor of the airbag module. Such a diffusor is designed to swirl gases discharged by the gas generator.

Particularly, the clamping element is formed as a reservoir that is configured and provided to receive a coolant that serves for cooling gases residing in the gas sack. By cooling of hot gases residing in the gas sack, the pressure inside the gas sack can be decreased within a short period of time. Thereby, the movable element is particularly designed to push the cooling liquid out of the reservoir upon moving out of the initial position, in order to set free the cooling liquid into an inner space of the gas sack i.e., the pressurized movable element is formed as a piston that mediates said pressure to the cooling liquid by acting on his part on the cooling liquid with a pressure. Hereby, the cooling liquid is ejected out of the reservoir. Of course, such a piston can also be provided in the form of a flexible membrane.

In a further embodiment of the invention, the movable element is designed to close a discharge opening of the airbag module in its initial position, through which discharge opening, in an opened state, gas can escape out of the gas sack into an outer space surrounding the airbag module, wherein, upon moving out of the initial position, the movable element opens the discharge opening, so that gas can be discharged out of the gas sack through said discharge opening out of the gas sack.

Particularly, in its initial position, the movable element is fastened to a part of the airbag module arranged in the inner space of the gas sack package, wherein said part particularly is a diffusor for guiding gases that are to be discharged into the gas sack.

Particularly, the movable element is fixed to said part of the airbag module through a predetermined breaking connection, wherein said predetermined breaking connection is particularly destroyed, when the movable element moves out of its initial position, so that the movable element is particularly freely movable.

Particularly, said discharge opening is formed in a diffusor, namely particularly in the flange of the diffusor, via which flange the diffusor can be fixed to the carrier of the airbag module, wherein the flange can also serve for clamping the gas sack to the carrier of the airbag module.

In a further embodiment of the invention, the movable element is designed to fix a tether to the carrier in its initial position, so that a closure of a discharge opening of the gas sack interacting with the tether closes said discharge opening formed in the gas sack. Such an openable discharge opening serves for discharging gas out of the gas sack in order to influence the pressure in the gas sack, so that the gas sack can be specifically adapted to the size (weight) and the position (relative to the gas sack) of a person to be protected. Particularly, the tether is furthermore fixed to the movable element in the way that the movable element sets free the tether upon moving out of the initial position, so that the tether is no longer fixed to the carrier of the airbag module through the movable element. This causes the closure of the discharge opening to open. The underlying opening mechanism can thereby be designed such that the tether is under tension in case of a movable element that resides in its initial position and thereby holds a closure in front of the discharge opening, wherein the tether, upon moving of the movable element out of the initial position, is loosened in a way that the closure is no longer arranged in front of the discharge opening and sets free the latter.

Particularly, the movable element is fixed in its initial position to a part of the airbag module arranged in the inner space of the gas sack package through a predetermined breaking connection, which part is particularly a flange of a diffusor of the airbag module. The predetermined breaking connection is configured and provided to be severed upon acting on the movable element with a pressure provided by the movement generating device, so that the movable element is moved out of its initial position due to said pressure. Here, said loosening of the tether occurs.

Of course, the movable element can serve as a closure of a discharge opening provided in the airbag module (e.g. in the diffusor or in the flange of the diffusor) as well as for setting free a tether that interacts with a discharge opening of the gas sack. Eventually, the tether or the discharge opening formed in the gas sack can be omitted.

For fixing the tether to the movable region, the tether comprises a loop at a free end, which is laid around the movable element.

Alternatively, a free end portion of the tether is form-fittedly arranged in a recess of the movable element for fixing the tether to the movable element.

In a further alternative variant, a free end portion of the tether is inserted into a through-opening of the movable element for fixing the tether to the movable element, wherein said end portion particularly engages behind a boundary region of the movable element delimiting the through-opening.

The described features and advantages of the invention shall be pointed out by means of the following description of Figures of embodiments.

Figure 2:
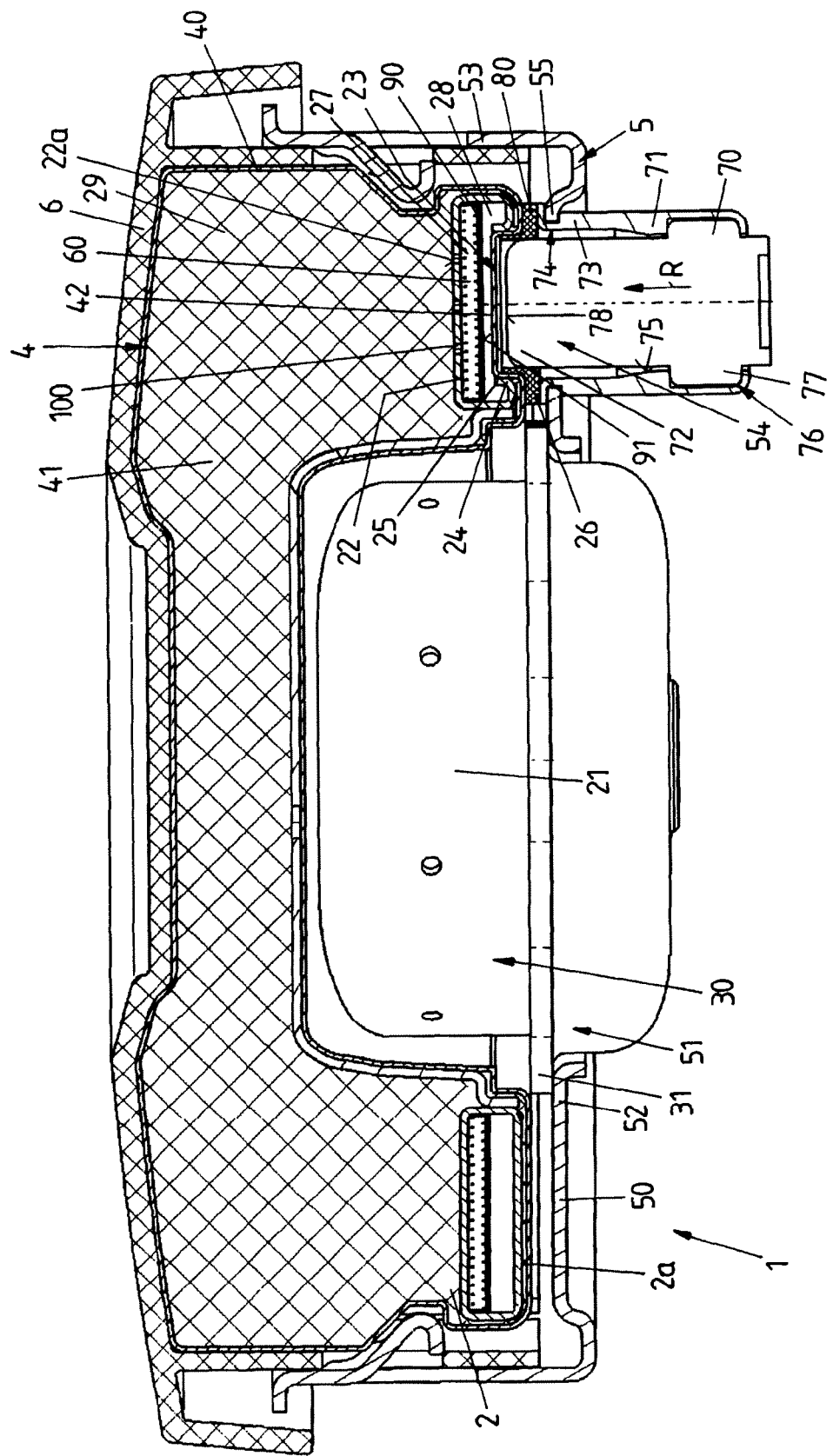
FIG. 2: shows a sectional view of the airbag module shown in FIG. 1, FIG. 3: shows a fragmentary sectional view of a further embodiment of the airbag module according to the invention having a locked tether.

FIG. 1 shows in conjunction with FIG. 2 an airbag module 1 according to the invention. The airbag module 1 is a driver airbag module. The teaching according to the invention is however also applicable to other airbag module types, particularly to co-driver airbag modules.

The airbag module 1 comprises a gas sack 2 and a diffusor 21 arranged in the gas sack 2 for swirling gases generated by a gas generator 30.

The diffusor 21 is formed cap-like and comprises a circulating flange 22 connected to the diffusor 21, which can be connected releasably (e.g. screw connection) or non-releasably (e.g. welded connection) to the diffusor 21 or can be integrally formed with the diffusor 21. The flange 22 is thereby formed as a reservoir for storing a coolant 60.

The gas sack 2 and the diffusor 21 including flange 22 are arranged in an inner space 41 surrounded by a protective covering 40 and, in this way, form together with said protective covering 40 a gas sack package 4. The inner space 41 of the gas sack package 4 is evacuated, so that the gas sack package 4 is as small-sized as a possible.

The gas generator 30 serves for inflating the gas sack 2, which gas generator 30 is arranged in an indentation of the gas sack package 4 defined by the diffusor 21, namely outside the gas sack package 4.

For carrying the gas sack package 4 and the gas generator 30, a carrier 5 is provided, which comprises a bottom 50 extending along an extension plane and having a central, continuous gas generator recess 51, out of which the gas generator 30 protrudes in sections, wherein the gas generator 30 is fixed to a boundary region 52 of the bottom 50 of the carrier 5 delimiting the gas generator recess 51 through a circulating flange 31 of the gas generator 30. A wall 53 of the carrier 5 protrudes from the bottom 50 along a first direction R, which in case of a driver airbag module particularly runs along the steering axis, which wall 53 circulates around the gas generator 30 in a plane (extension plane of the bottom 50) extending across the first direction R. A cover 6 of the airbag module 1 is also fixed to said wall 53, which cover 6 covers the gas sack package 4 and the gas generator 30 lying thereunder.

For setting free the coolant 60 stored in the reservoir 22, a movement generating device 70 in the form of a gas generator is provided, which is fixed to the bottom 50 of the carrier 5 by means of a shell 71, wherein said shell 71 encompasses the gas generator 70 across the first direction R. Particularly, the movement generating device 70 comprises a cylindrical shape, wherein the cylinder axis runs parallel to the first direction R. Correspondingly, said shell 71 is particularly shaped as a hollow cylinder.

The movement generating device 70 is fixed to the carrier 5 such that the movement generating device 70 protrudes with a free end portion 72 along the first direction R through a through-opening 54 formed in the bottom 50 into the carrier 5 of the airbag module 1.

For sealing the through-opening 54 of the bottom 50 and for protecting the protective covering 40, a sealing element 80 is (optionally) provided, which sealing element 80 encompasses the free end portion 72 of the movement generating device 70 across the first direction R.

The details of the arrangement of the movement generating device 70 with respect to the reservoir 22 are shown in the sectional view according to FIG. 2.

According thereto, the shell 71 comprises a groove 74 on a boundary region 73 of the shell 71 circulating around the free end portion 72 of the movement generating device 70, into which groove 74 the boundary 55 of the bottom 50 of the carrier 5 delimiting the through-opening 54 of the carrier 5 engages, so that the shell 71 is fixed to the bottom 50 of the carrier 5. Furthermore, the shell 71 comprises an inside 75 facing the movement generating device 70, on which inside a groove 76 is formed too, into which groove 76 a circulating region 77 of the movement generating device 70 engages, so that the movement generating device 70 firmly fits into the shell 71.

The shell 71 is dimensioned such that the movement generating device 70 protrudes with its free end portion 72 along the first direction R into the carrier 5 of the airbag module. The optional sealing element 80 thereby encompasses the free end portion 72 of the movement generating device 70 across the first direction R in a closed annular manner.

A further congruent through-opening 23 (not shown in FIG. 1) of the circulating clamping element 22 formed as a reservoir faces the through-opening 55 of the bottom 50 of the carrier 5 along the first direction R. The free end portion 72 of the movement generating device 71 can also be inserted into this opening 23, wherein a wall 25 protrudes from a boundary region 24 of said further through-opening 23 along the first direction R, which wall 25 circulates around said free end portion 72 of the movement generating device 70 across the first direction R, wherein the free end portion 72 of the movement generating device 70 can be inserted such into the further through-opening 23 that the sealing element 80 encompassing the free end portion 72 presses the protective covering 40 of the gas sack package 4 against said wall 25. In case no such sealing element 80 is present, the movement generating device 70 can be configured and provided for pressing the protective covering 40 of the gas sack package 4 against said wall 25 through its free end portion 72.

Thus, the sealing element 80 serves for protecting the protective covering 40 of the gas sack package 4. On the other hand, the sealing element 80 comprises a circulating protrusion 26 extending across the first direction R, which protrusion 26 is arranged along the first direction R between boundary regions of the two through-openings 54, 23 facing each other in a way that it seals said two through-openings 54, 23. Thus, the further through-opening 23 of the clamping element 22 is merely closed by the protective covering 40. Here, a region 42 of said protective covering 40 covering the further through-opening 23 faces a front face 78 of the movement generating device 70 extending across the first direction R.

Said clamping element 22 forms a reservoir for a cooling liquid 60 circulating around the gas generator 30, wherein through said through-opening 23 a pressure can be introduced into the reservoir 22. For pressing out the cooling liquid 60 residing in the reservoir 22, said reservoir 22 is divided into two parts 27, 28 along the first direction R, namely into a first part 28 and a second part 27, which are separated from each other through a movable element 90 in the form of a flexible membrane, wherein said membrane 90 is designed evenly annular and particularly circulates around the gas generator 30 across the first direction R.

In case the movement generating device 70 now provides a pressure via its free end portion 72, for instance by generating combustion gases (gas generator), these hot gases destroy the region 42 of the protective covering 40 facing the front side 78 of the movement generating device 70, penetrate through the further through-opening 23 into the first part 28 of the reservoir 22 and pressurize the membrane 90 extending across the first direction R in its initial position. In the initial position, the membrane 90 (movable element) can thereby comprise a bulge towards the bottom 50 of the carrier 5, so that a corresponding volume for storing a coolant 60 is present in the second part 27 of the reservoir 22. In the initial position, the membrane 90—as shown in FIG. 2—can however also extend evenly along a plane.

Upon pressurizing the side 91 of said membrane 90 facing the bottom 50 of the carrier 5 with a pressure provided by the movement generating device 70 (hot gases), the membrane 90 is pushed away along the first direction R from the bottom 50 of the carrier 5, so that an eventually existing bulge is inverted and now points in the first direction R. Here, the membrane 90 takes along the cooling liquid 60 along the first direction R and sets it free through the outflow opening 100 of the reservoir 22 into the inner space 29 of the gas sack 2 surrounded by the gas sack 2. Thereby, said outflow openings 100 are formed in an upper side to 22*a* of the circulating reservoir 22 (clamping element or circulating flange of the diffusor) facing the inner space 29 of the gas sack 2. Particularly, the outflow openings 100 of the reservoir 22 are provided with closures, which are destroyed (opened) due to the pressure mediated by the membrane 90.

In order to be able to discharge the coolant 60 directly into an inner space 29 of the gas sack 2, said reservoir 22 is arranged in the inner space 29 of the gas sack 2. At the same time, the reservoir 22 fixes the gas sack 2 of the gas sack package 4 to the carrier 5 of the airbag module 1. For this, a circulating boundary region 2*a* of an inflow opening of the gas sack 2, through which the diffusor 21 and the reservoir 22 are inserted into the inner space 29 of the gas sack 2, is clamped between the bottom 50 of the carrier 5 and said reservoir 22.

For setting free the coolant 60, the movement generating device 70 can be activated at an arbitrary point in time by means of a sensor system, namely before, during and after inflation of the gas sack 2. The point in time of activation of the movement generating device 70 can be particularly calculated by an evaluation electronics, namely depending on parameters detected by the sensor system, like for instance the size (weight) and the position of a person to be protected relative to the gas sack 2. Determination of the point in time of activation of the movement generating device 70 can take place in real-time.

By spraying the coolant 60 into the inner space 29 of the gas sack 2, gases residing thereabouts are cooled, so that, according to known laws of physics, the pressure in the inner space 29 of the gas sack 2 is correspondingly decreased.

Figure 3:
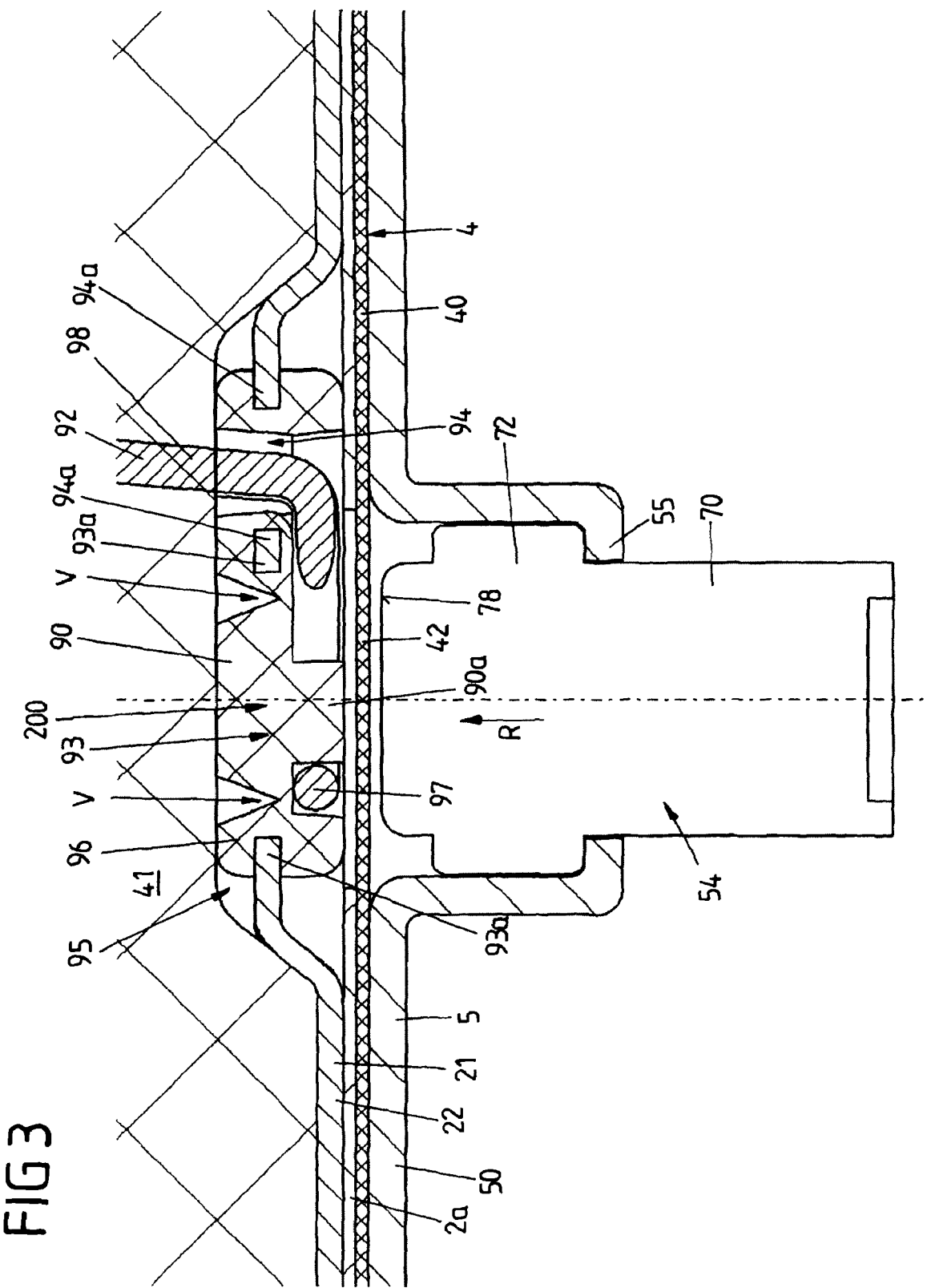
Figure 4:
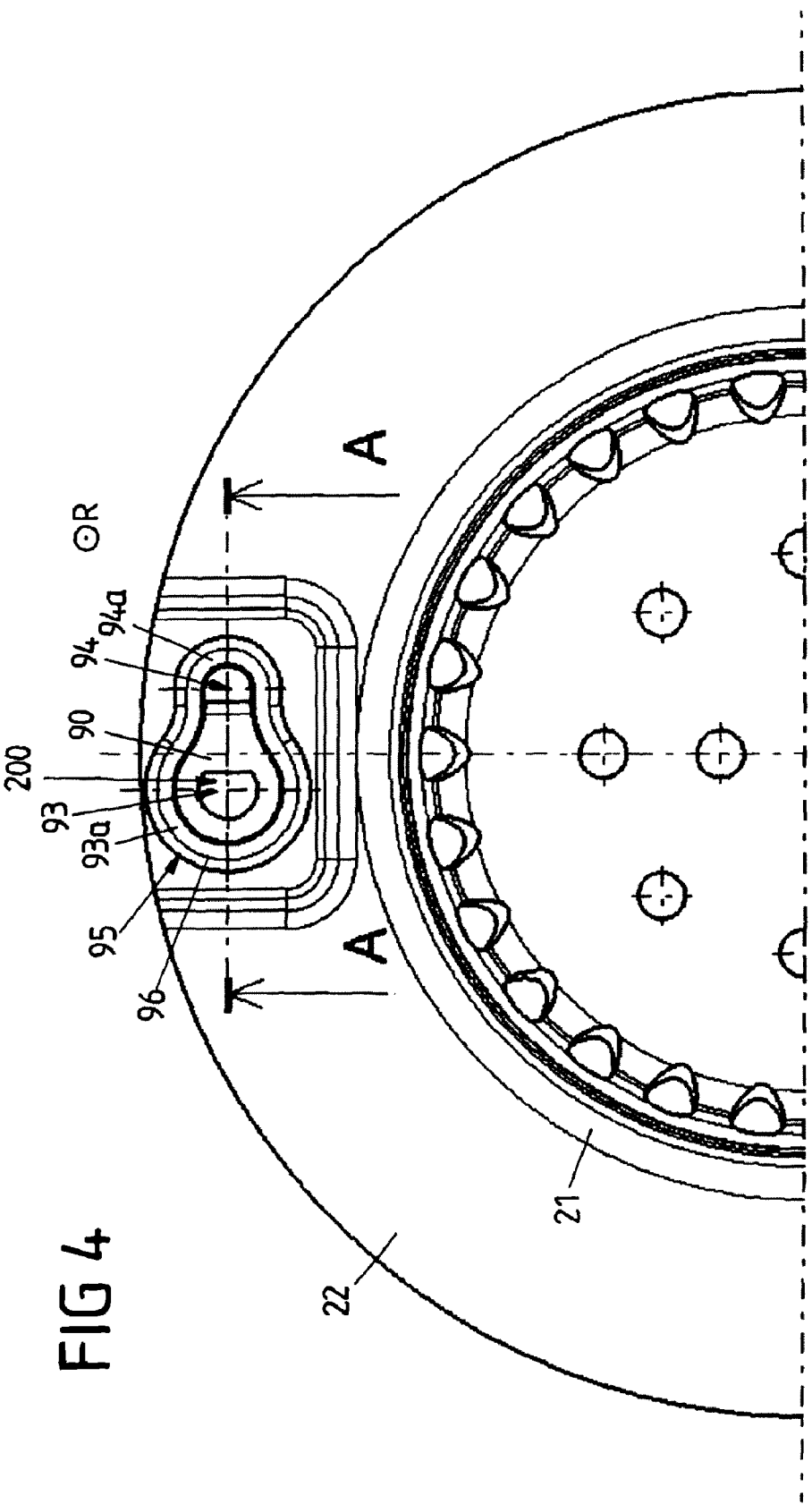
FIG. 4: shows a fragmentary plan view onto a diffusor (including flange) of the airbag module shown in FIG. 3, FIG. 5: shows a fragmentary cut along the line A-A of FIG. 4, FIG. 6: shows a fragmentary sectional view of the airbag module shown in FIG. 3 having an activated movement generating device.
Figure 5:
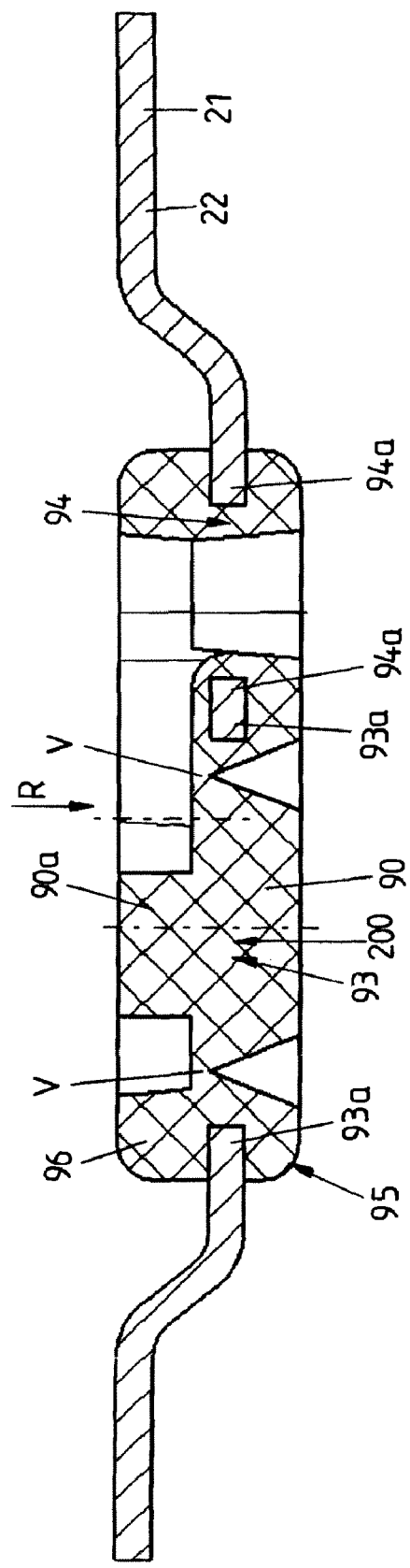

FIG. 3 shows in conjunction with the FIGS. 4 to 7 a further embodiment of an airbag module according to the invention having a gas sack package 4 and a carrier 5 according to FIGS. 1 and 2.

In contrast to FIGS. 1 and 2, no reservoir 22 having a cooling liquid 60 is provided in the inner space 41 of the gas sack package 4, but a mechanism for activating a tether 92, which, in a set-free and non-tensioned state, opens a discharge opening (not shown) of the gas sack 2.

For this, two adjacent through-openings are formed in a circulating flange 22 of a diffusor 21, which can serve in the already afore-described manner for clamping a gas sack 2 at the bottom 50 of the carrier 5 of the airbag module 1, which through-openings are denoted as first and second opening 93, 94, each having a circulating boundary region 93*a*, 94*a*, on which a retaining element 95 for the tether 92 is molded, so that said retaining element 95 closes the first larger opening 93 and leaves the second opening 94 open in sections. The retaining element 95 comprises a movable element 90, which is arranged in the first opening 93 and connected through a circulating predetermined breaking connection V to a frame 96 of the retaining element 95. The retaining element 95 is particularly connected to the flange 22 through this frame 96.

From said movable element 90 a free end portion 90*a* of the movable element 90 protrudes counter to the first direction R, around which end portion 90*a* a loop 97 formed at a free end of the tether 92 is laid. A central portion 98 of the tether 92 going off from this loop 97 is now passed from the side of the flange 22 of the diffusor 21 facing the bottom 50 of the carrier 5 through the left-open second opening 94 on a side of the flange 22 facing away from the bottom 50 of the carrier 5 of the airbag module 1.

Thus, said tether 92 is fixed to the flange 22 of the diffusor 21 through the loop 97. Said central portion 98 of the tether 92 interacts in a suitable manner with a discharge opening of the gas sack 2 such that said discharge opening is closed in case of an inflated gas sack 2 as long as the tether 92 is fixed to the flange 22 of the diffusor 21 through the movable element 90 and the loop 97 laid around the free end portion 90*a* of the movable element 90.

The retaining element 95, particularly the movable element 90, faces with its free end portion 90*a*, around which said loop 97 of the tether 92 is laid, the front face 78 of the free end portion 72 of the movement generating device 70 along the first direction R. Along the first direction R, merely the protective covering 40 of the gas sack package 4 as well as eventually a region of the gas sack 2 are arranged between the movement generating device 70 and the retaining element 95. The movement generating device 70 itself is located in a through-opening 54 of the bottom 50 of the carrier 5 of the airbag module 1, wherein according to FIG. 3 said through-opening 54 of the bottom 50 of the carrier 5 is formed in a region of the carrier 5 protruding counter to the first direction R from the bottom 50. For fixing the movement generating device 70 to the carrier 5 of the airbag module 1, the free end portion 72 of the movement generating device 70 protruding into the carrier 5 engages behind a circulating boundary region 55 of said through-opening 54 of the bottom 50 of the carrier 5. In case the movement generating device 70 is activated, which can occur at an arbitrary point in time that can be determined by an evaluation electronics in real-time (particularly depending on the size (weight) and the position of a person to be protected relative to the gas sack), the movement generating device 70 acts on a region 42 of the protective covering 40, which faces the movable element 90 along the first direction R, with a hot gas, so that said region 42 of the protective covering 40 is severed and the movable element 90 lying behind is pressurized with a corresponding pressure. Hereby, the predetermined breaking connection V between the movable element 90 and the frame 96 (immobile part) of the retaining element 95 is destroyed, so that the movable element 90 is moved out of its initial position, wherein it sets free the loop 97 of the tether 92 in order to open said discharge opening of the gas sack 2 (FIGS. 6 and 7).

As an alternative or a supplement to the afore-described tether mechanism, the movable element 90 can close, in its initial position, a discharge opening 200 of the airbag module 1 formed in the diffusor 21 itself, particularly in the flange 22, which discharge opening 200 can be formed by the first opening 93.

Here, the movable element 90 sets free said discharge opening 200 when it is moved out of its initial position (under destruction of the predetermined breaking point V). Then, gases residing in the gas sack 2 can escape through the discharge opening 200 formed in the diffusor 21 and can be eventually discharged in an outer space surrounding the airbag module 1. Eventually, the tether 90 can be omitted, so that merely the discharge opening 200 provided in the diffusor 22 can be opened by means of the movable element 90.

Figure 6:
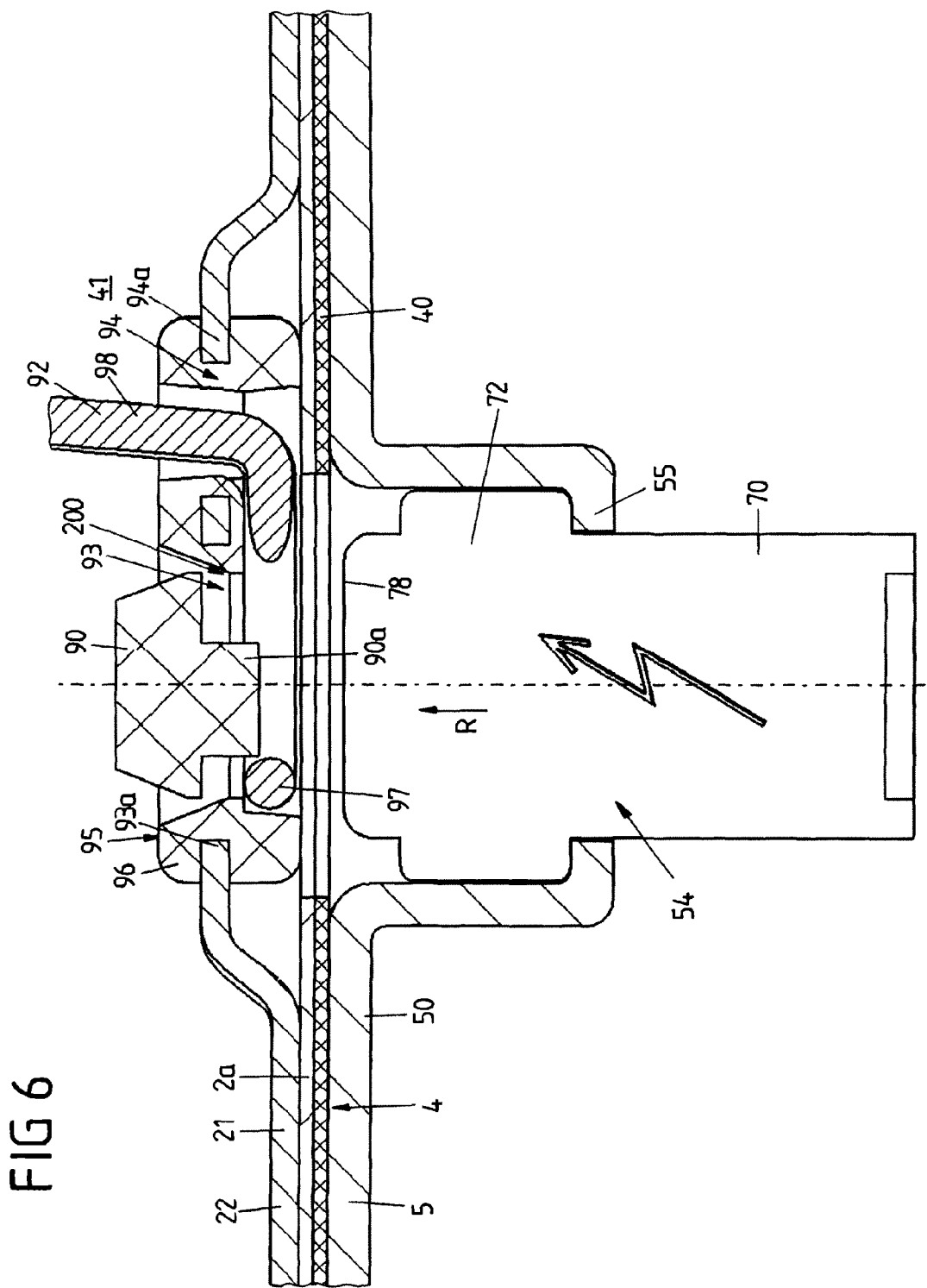
Figure 7:
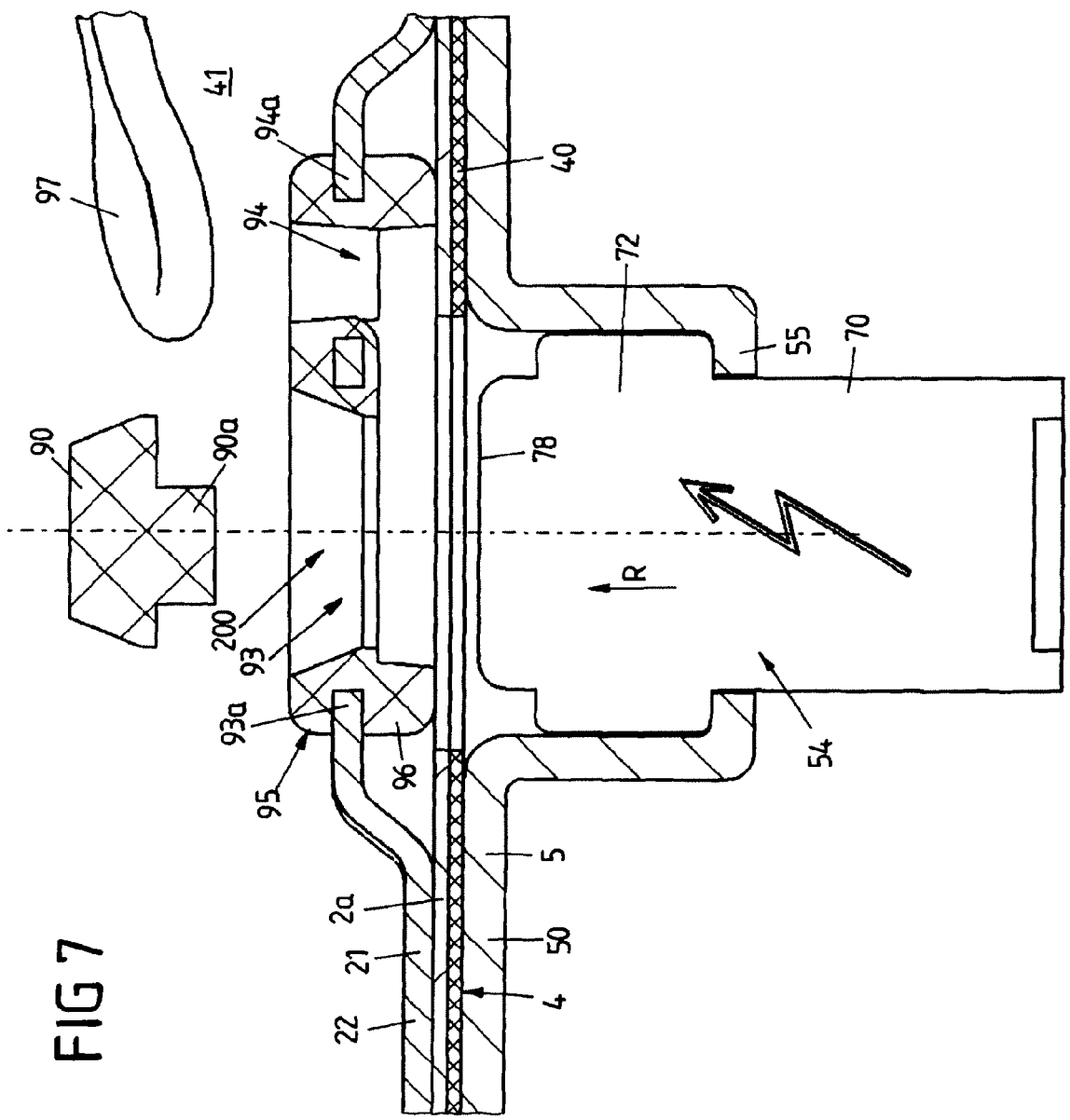
FIG. 7: shows a fragmentary sectional view of the airbag module shown in FIG. 6, wherein the pressurized movable element has set free the tether.
Figure 8:
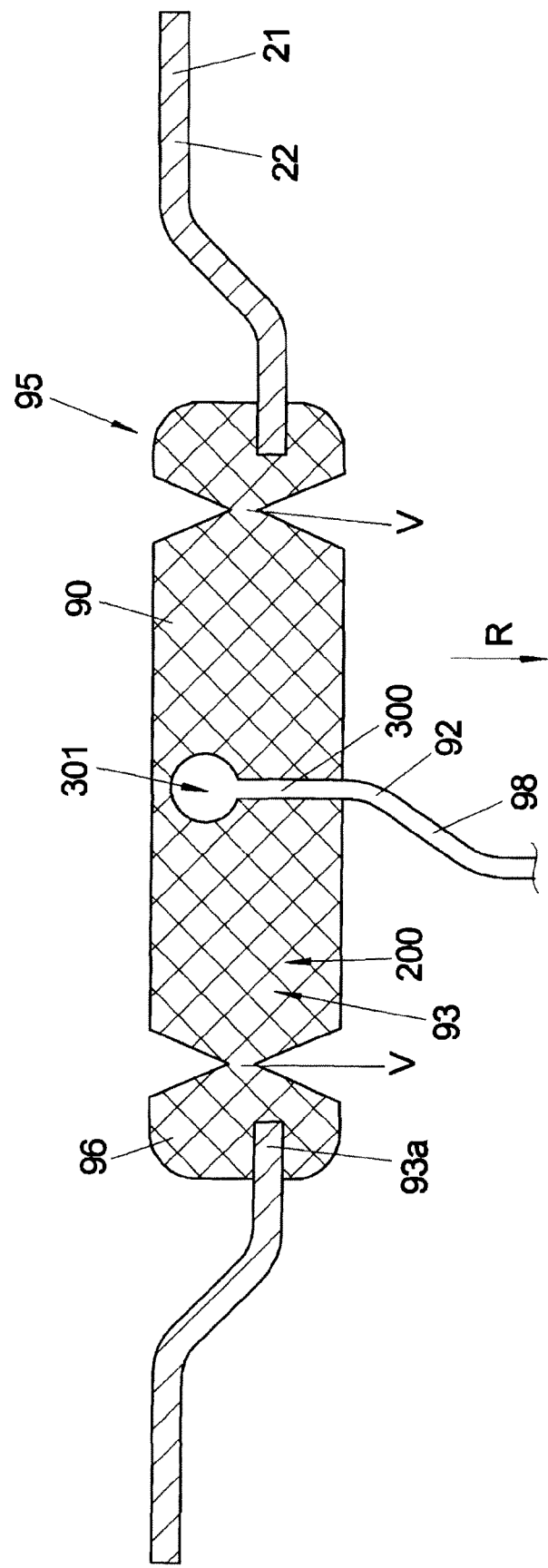
FIG. 8: shows an alternative sectional view of a modification of the movable element shown in FIG. 6, and FIG. 9: shows a further alternative sectional view of a modification of the movable element shown in FIG. 6.
Figure 9:
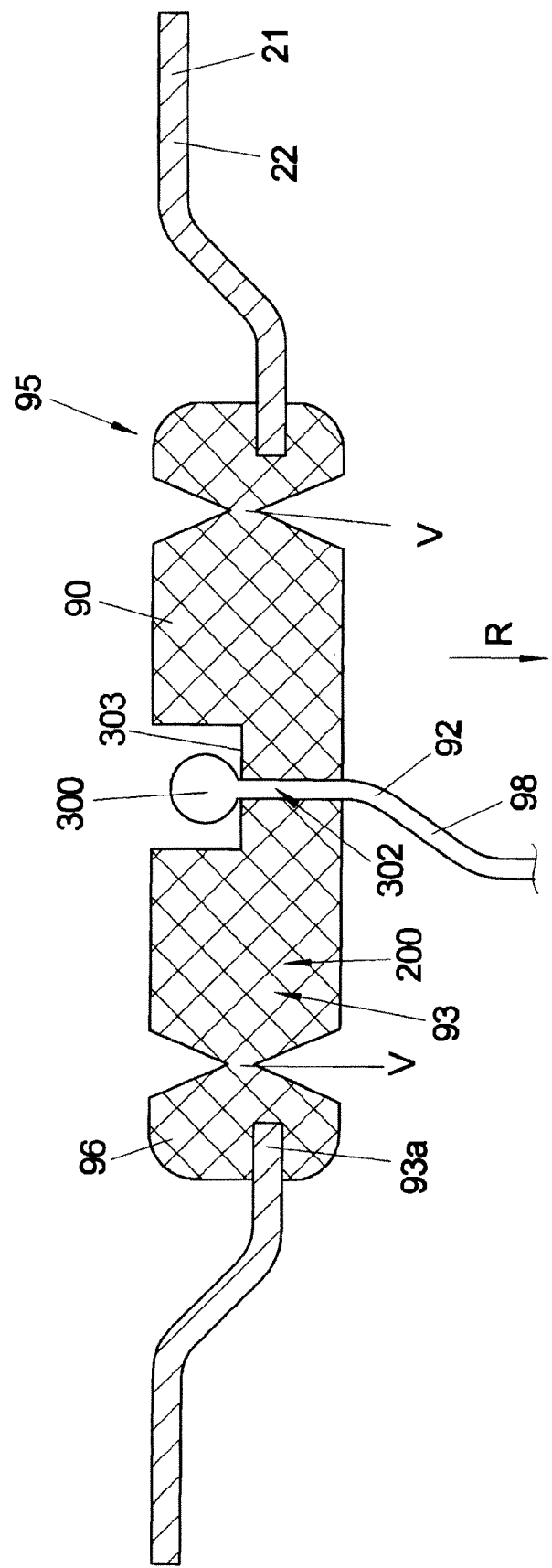

The FIGS. 8 and 9 show an alternative embodiment of the movable element 90 shown in FIG. 6, in case of which the tether 92 is not fixed to the movable element 90 by means of a loop 97.

According to FIG. 8 the movable element 90 comprises a recess 301, in which a free end portion 300 of the tether 92 that is integrally formed with the central portion 98 of the tether 92 is permanently form-fittedly held (embedded), so that the movable element 90 takes along the free end portion 300 of the tether 92 when it is moved out of its initial position.

Alternatively, the free end portion 300 of the tether 92 engages according to FIG. 9 through a through-opening 302 formed in the movable element 90 and thereby engages behind a boundary region 303 of said through-opening 302 delimiting the through-opening 302. Also in this variant, the movable element 90 takes the free end portion 300 of the tether 92 along when it is moved out of its initial position.

In contrast to FIG. 6, merely the first opening 93 is present in the embodiments according to the FIGS. 8 and 9. This first opening 93 comprises a boundary region 93a, on which the retaining element 95 for the tether 92 is molded, so that the retaining element 95 closes the first opening 93. Again, the movable element 90 is arranged in the first opening 93 and connected through a circulating predetermined breaking connection V to the frame 96 of the retaining element 95, which is molded on said boundary region 93a. Of course, the first opening 93 can also form an afore-described discharge opening 200 of the airbag module 1, so that eventually also in case of the embodiments according to the FIGS. 8 and 9 a tether 92 (and a discharge opening arranged in the gas sack 2) can be omitted.

In particular, the following embodiments of the principle of the invention shall be pointed out once more: So, in one embodiment it is provided that the free end portion 72 of the movement generating device 70 is arranged along the first direction R in or in front of a further through-opening 23 of a component 22 of the airbag module 1 arranged in the inner space 41 of the gas sack package 4.

Furthermore, it can be provided that the through-opening 54 of the carrier 5 aligns with the further through-opening 23 of said component 22.

Furthermore, it can be provided that a circulating wall 25 of the component 22 protrudes along the first direction R from a boundary 24 delimiting the further through-opening 23, wherein said wall 25 circulates around the free end portion 72 of the movement generating device 70 across the first direction R, and wherein the free end portion 72 particularly butts against said wall 25 at least with interposition of the protective covering 40.

Furthermore, an embodiment can be characterized by a sealing element 80 circulating around the free end portion 72 of the movement generating device 70 in a plane extending across the first direction R, which sealing element 80 rests on the free end portion 72, wherein the protective covering 40 circulates around said sealing element 80 along said plane, and wherein the free end portion 72 particularly butts against the wall 25 with interposition of the sealing element 80 and the protective covering 40.

Furthermore, it can be provided that the reservoir 22 is formed by a circulating flange of a diffusor 21 of the airbag module 1.

Furthermore, it can be provided, that said part 21 is formed as a diffusor for distributing gases.

Furthermore, it can be provided that the discharge opening 200 is formed in the diffusor 21.

Furthermore, it can be provided that the tether 92 comprises a loop 97 for fixing it to the movable element 90, which loop 97 encompasses the movable element 90 residing in the initial position.

Furthermore, it can be provided that a free end portion 300 of the tether 92 is form-fittedly arranged in a recess 301 of the movable element 90 for fixing the tether 92 to the movable element 90.

Furthermore, it can be provided, that a free end portion 300 of the tether 92 is arranged in a through-opening 302 of the movable element 90 for fixing the tether 92 to the movable element 90, wherein said free end portion 300 particularly engages behind a boundary region 303 of the movable element 90 delimiting the through-opening 302.

The priority application, German Patent Application No. 10 2008 050 759.8, filed Oct. 7, 2008, including the specification, drawing, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed from the present disclosure within the scope and spirit of the present invention are to be included as further embodiments of the present invention. The scope of the present invention is to be defined as set forth in the following claims.

What is claimed is:

1. An airbag module for a motor vehicle, comprising:
 a gas sack package, comprising:
  a gas sack,
  a movable element configured and provided to influence a state variable of the gas sack, and
  a gas-tight protective covering that defines an inner space of the gas sack package, wherein the gas sack and the movable element are arranged in said inner space, and
 a movement generating device configured and provided to move the movable element, in order to influence the state variable,
 wherein the movement generating device is arranged separately outside the inner space of the gas sack package such that the movement generating device is at least separated by the protective covering from components of the airbag module arranged in the inner space of the gas sack package.

2. The airbag module as claimed in claim 1, wherein the state variable is a pressure inside the gas sack.

3. The airbag module as claimed in claim 1, wherein the inner space of the gas sack package is evacuated for compacting the gas sack package.

4. The airbag module as claimed in claim 1, further comprising a carrier of the airbag module for carrying the gas sack package, wherein the movement generating device is arranged on the carrier.

5. The airbag module as claimed in claim 4, wherein the movement generating device is arranged in a through-opening of the carrier, so that a free end portion of the movement generating device, via which pressure for acting on the movable element is provided, protrudes along a first direction out of said through-opening, and wherein the free end portion of the movement generating device faces the movable element along the first direction.

6. The airbag module as claimed in claim 5, wherein the free end portion of the movement generating device is arranged along the first direction in or in front of a further through-opening of a component of the airbag module arranged in the inner space of the gas sack package.

7. The airbag module as claimed in claim 5, further comprising a shell for carrying the movement generating device, wherein said shell encompasses the movement generating device and is, for fixing the movement generating device to the carrier, fixed to a circulating boundary region of the through-opening of the carrier.

8. An airbag module for a motor vehicle, comprising:
a gas sack package, comprising:
a gas sack,
a movable element configured and provided to influence a state variable of the gas sack, and
a gas-tight protective covering that defines an inner space of the gas sack package, wherein the gas sack and the movable element are arranged in said inner space, and
a movement generating device configured and provided to move the movable element, in order to influence the state variable,
wherein the movement generating device is arranged separately outside the inner space of the gas sack package such that the movement generating device is at least separated by the protective covering from components of the airbag module arranged in the inner space of the gas sack package,
wherein the movement generating device is configured and provided to move the movable element out of an initial position, in which the movable element does not influence said state variable, in a way that the movable element influences said state variable.

9. The airbag module as claimed in claim 8, wherein the movable element is fixed in its initial position to a part of the airbag module arranged in the inner space of the gas sack package.

10. The airbag module as claimed in claim 9, wherein the movable element is fixed through a predetermined breaking connection to the part of the airbag module, wherein said predetermined breaking connection, upon moving of the movable element out of its initial position, is severed.

11. The airbag module as claimed in claim 8, wherein the movable element is configured and provided to close a discharge opening of the airbag module in its initial position, through which, in an opened state, gas can escape out of the gas sack, wherein the movable element upon moving out of the initial position sets free the discharge opening so that gas can escape through the discharge opening out of the gas sack.

12. The airbag module as claimed in claim 8, wherein the movable element is configured and provided to fix in its initial position a tether to the airbag module in a way, that a closure of a discharge opening of the gas sack interacting with the tether closes said discharge opening, wherein the movable element upon moving out of the initial position sets free the tether, so that said closure is opened.

13. An airbag module for a motor vehicle, comprising:
a gas sack package, comprising:
a gas sack,
a movable element configured and provided to influence a state variable of the gas sack, and
a gas-tight protective covering that defines an inner space of the gas sack package, wherein the gas sack and the movable element are arranged in said inner space, and
a movement generating device configured and provided to move the movable element, in order to influence the state variable,
wherein the movement generating device is arranged separately outside the inner space of the gas sack package such that the movement generating device is at least separated by the protective covering from components of the airbag module arranged in the inner space of the gas sack package,
wherein the movement generating device is configured and provided to act on the movable element with a pressure, in order to move the movable element out of an initial position, and
wherein the movement generating device is formed as a gas generator.

14. An airbag module for a motor vehicle, comprising:
a gas sack package, comprising:
a gas sack,
a movable element configured and provided to influence a state variable of the gas sack, and
a gas-tight protective covering that defines an inner space of the gas sack package, wherein the gas sack and the movable element are arranged in said inner space, and
a movement generating device configured and provided to move the movable element, in order to influence the state variable, wherein the movement generating device is arranged separate outside the inner space of the as sack package such that the movement generating device is at least separated by the protective covering from components of the airbag module arranged in the inner space of the gas sack package, and
a carrier of the airbag module for carrying the gas sack package, wherein the movement generating device is arranged on the carrier,
wherein the movement generating device is arranged in a through-opening of the carrier so that a free end portion of the movement generating device, via which pressure for acting on the movable element is provided, protrudes along a first direction out of said through-opening,
wherein the free end portion of the movement generating device faces the movable element along the first direction,
wherein a region of the protective covering faces a front face of the movement generating device extending across the first direction, and
wherein said region is destroyed, when the movement generating device provides said pressure.

15. An airbag module for a motor vehicle, comprising:
a gas sack package, comprising:
a gas sack,
a movable element configured and provided to influence a state variable of the gas sack, and a gas-tight protective covering that defines an inner space of the gas sack package, wherein the gas sack and the movable element are arranged in said inner space, and a movement generating device configured and provided to move the movable element, in order to influence the state variable, wherein the movement generating device is arranged separately outside the inner space of the gas sack package such that the movement generating device is at least separated by the protective covering from components of the airbag module arranged in the inner space of the gas sack package, and a carrier of the airbag module for carrying the gas sack package, wherein the movement generating device is arranged on the carrier, wherein the movement generating device is arranged in a through-opening of the carrier, so that a free end portion of the movement generating device, via which pressure for acting on the movable element is provided, protrudes along a first direction out of said through-opening, wherein the free end portion of the movement generating device faces the movable element along the first direction, wherein the free end portion of the movement generating device is arranged along the first direction in or in front of a further through-opening of a further component of the airbag module arranged in the inner space of the gas sack package, wherein the further component is formed as a reservoir for storing a coolant, the reservoir being formed by a clamping element for clamping the gas sack to the carrier, and wherein the movable element is configured and provided to press the coolant out of the reservoir upon moving out of an initial position, in order to set free the coolant into an inner space of the gas sack.

\* \* \* \* \*